Figure 12:
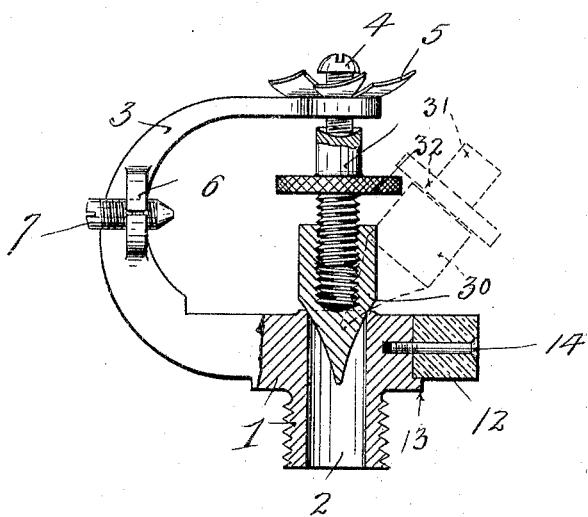

No. 784,210. PATENTED MAR. 7, 1905.
C. B. GARRETT.
AUTOMATIC SPRINKLER.
APPLICATION FILED MAR. 8, 1902.
3 SHEETS—SHEET 1.
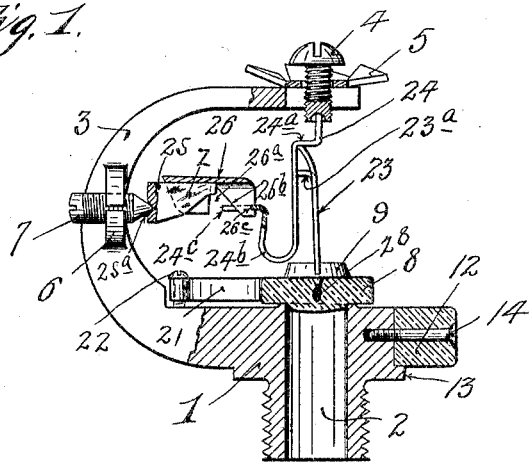
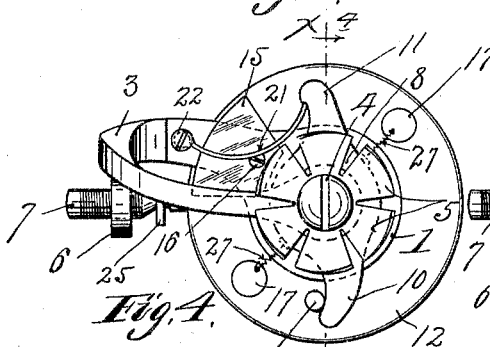
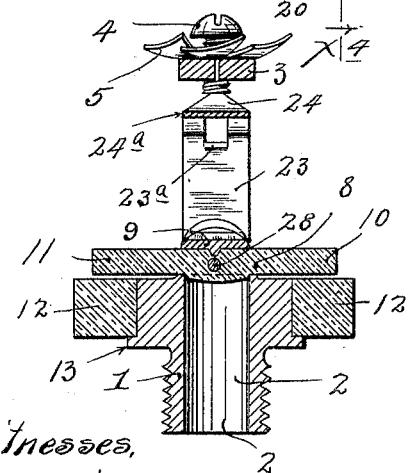
Witnesses,
Inventor
Charles B. Garrett,
By his Attorneys,
Williamson Merchant

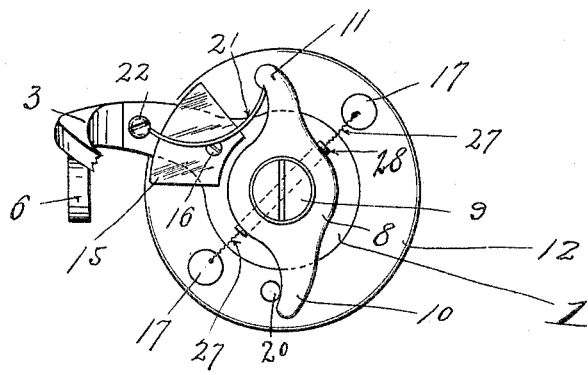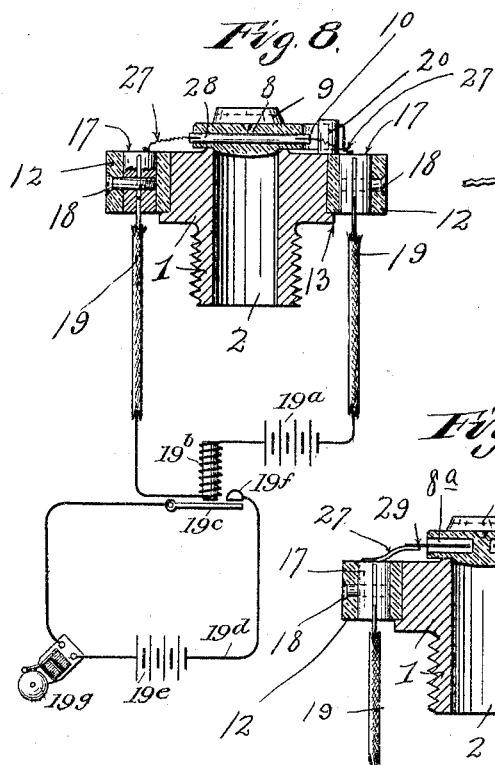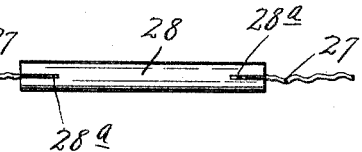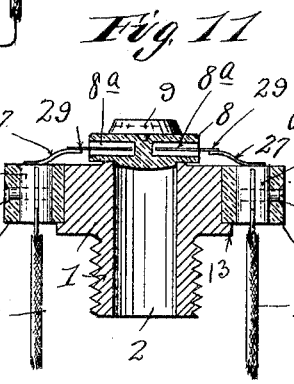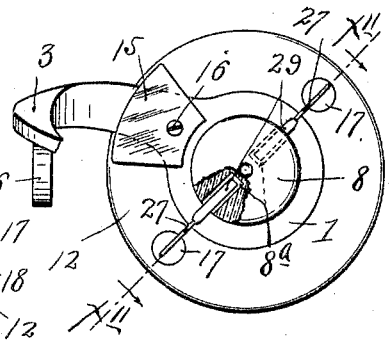

No. 784,210. PATENTED MAR. 7, 1905.
C. B. GARRETT.
AUTOMATIC SPRINKLER.
APPLICATION FILED MAR. 8, 1902.

3 SHEETS—SHEET 3.

Witnesses,
H. D. Kilgore
A. H. Opsahl.

Inventor,
Charles B. Garrett.
By his Attorneys.
William Merchant

No. 784,210. Patented March 7, 1905.

UNITED STATES PATENT OFFICE.

CHARLES B. GARRETT, OF MINNEAPOLIS, MINNESOTA, ASSIGNOR OF ONE-HALF TO EMMA G. GARRETT, OF MINNEAPOLIS, MINNESOTA.

AUTOMATIC SPRINKLER.

SPECIFICATION forming part of Letters Patent No. 784,210, dated March 7, 1905.

Application filed March 8, 1902. Serial No. 97,233.

*To all whom it may concern:*

Be it known that I, CHARLES B. GARRETT, a citizen of the United States, residing at Minneapolis, in the county of Hennepin and State of Minnesota, have invented certain new and useful Improvements in Automatic Sprinklers; and I do hereby declare the following to be a full, clear, and exact description of the invention, such as will enable others skilled in the art to which it appertains to make and use the same.

My present invention relates to automatic sprinklers for automatic fire-extinguishing systems, and has for its object to improve the same in the several particulars hereinafter noted.

The invention consists of the novel devices and combinations of devices hereinafter described, and defined in the claims.

The invention is illustrated in the accompanying drawings, wherein like characters indicate like parts throughout the several views.

Figure 1 is a view, partly in side elevation and partly in section, showing an automatic sprinkler embodying the several features of my invention. Fig. 2 is a plan view of the sprinkler. Fig. 3 is a plan view of the same with some parts broken away and others sectioned. Fig. 4 is a vertical section taken approximately on the line $x^4\ x^4$ of Fig. 2. Fig. 5 is a detail view in side elevation of the so-called "fusible strut." Fig. 6 is a plan view of the said fusible strut. Fig. 7 is a view principally in plan, but with some parts broken away and others removed. Fig. 8 is a vertical section on the line $x^8\ x^8$ of Fig. 3, some parts being removed. Fig. 9 is a detail showing a portion of the annunciator-circuit. Fig. 10 is a view corresponding to Fig. 7, but illustrating a modified construction. Fig. 11 is a vertical section on the line $x^{11}\ x^{11}$ of Fig. 10; and Fig. 12 is a view, partly in side elevation and partly in vertical section, showing a novel plug for closing the water-delivery orifice without the use of the automatically-released stopper.

The numeral 1 indicates a head having a water-delivery orifice 2 and adapted to be supported in the usual way at the delivery end of the water-distribution pipe. This head is provided with an upwardly and inwardly curved yoke or arm 3, the end of which terminates over the upper end of the orifice 2 and is provided thereat with a screw 4 and with an ordinary spraying-wheel 5. The yoke-arm 3 is also curved or bent laterally and provided with a split lug 6, through which works with screw-threaded engagement an adjusting-screw 7, the axis of which intersects at a right angle the common axes of the orifice 2 and screw 4. The prongs of the split lug 6 are adapted to spring slightly, so that they always tightly clamp the screw 7 in whatever position it may be set.

The orifice 2 is normally closed by a stopper 8, preferably of porcelain, but provided with a detachable cap or block 9. The stopper 8 is preferably depressed slightly within the orifice 2, and it is provided at nearly diametrically opposite points with projecting ends or lugs 10 and 11 for an important purpose which will presently appear. An incomplete ring 12, of porcelain or similar non-conductive material, telescopes around and closely fits the head 1, with its body portion resting on a ledge 13 and with its ends embracing the sides of the base of the yoke 3. As shown, the said ring 12 is further held in place by a screw 14, passed therethrough and screwed into the head 1, and, further, by a light metal clip 15, shown as secured to the head 1 by a screw 16 and with its sides projecting and overlapping the ends of the said element 12. This insulating-support 12 has vertical seats or perforations in which split contact-plugs 17 are seated. Screws 18, loosely passed through the said support 12 and through one prong of each plug 17 and screwed into the other prongs thereof, serve to hold the said plugs in position and to clamp the same onto the ends of the lead-wires 19.

The end or lug 10 of the stopper 8 normally bears against a fulcrum-pin 20, shown as held by the support 12. A leaf-spring 21, shown as connected at one end by a screw 22 to the base of the yoke 3, bears at its other end against the end or lug 11 of the stopper 8 and tends to unseat the same with a fulcrum action against the pin 20. Such unseating action is normally restrained, but will take place at the proper time and in a manner hereinafter clearly set forth.

The stopper 8 is normally held in its closed position directly by a spring-strut having a toggle action and indirectly by a fusible strut of novel construction which is preferably applied to directly hold in working position the said spring-strut. The best arrangement of these two devices is illustrated in Figs. 1 to 7, inclusive, wherein the two members of the so-called "spring-strut" are indicated by the numerals 23 and 24, while the two members of the so-called "fusible strut" are indicated by the numerals 25 and 26. The strut member 24 is formed with an offset shoulder $24^a$ and with a depending curved spring-section $24^b$, the extended end of which is pronged, as shown at $24^c$. The strut member 23 below its upper end is formed with a laterally-projecting finger or lug $23^a$. The extreme upper end of the strut member 24 is brought to a point and engages a recess in the depending end of the screw 4, while the lower end of the strut member 23 is notched and engages with a groove cut in the face of the pressing-block 9. The member 25 of the fusible strut is provided at its outer end with a depression $25^a$, which receives the point of the adjusting-screw 7. The inner end of said section 25 is bent laterally to form a cam-lug $25^b$. The strut member 26 is in the form of a channel or sheath, which is open at one side and is provided at its open side with a large notch $26^a$, one side of which is inclined to afford a cam-surface $26^b$. At its extreme inner end said section 26 is provided with a notch $26^c$. When the parts of the fusible strut are put together as indicated in the drawings and as best shown in Figs. 1, 5, and 6, the outer portion of the section 26 embraces the body portion of the section 25, and these interlapping parts 25 and 26 are rigidly connected by solder $z$ of the proper fusibility.

The two struts are applied, as indicated in the drawings, to normally securely hold the stopper 8 in position to close the orifice 2. The endwise compression strain on the spring-strut may be varied by adjusting the screw 4, while the lateral strain put upon the same through the fusible strut 25 26 may be varied by adjusting the screw 7. In view of the lateral pressure put upon the two spring-strut sections 23 and 24 by the pressing-lugs $23^a$ the said parts are given an additional tendency to buckle over that which is given them simply by the endwise pressure thereon. Hence when the said spring-strut is released by the separation of the parts of the fusible strut a self-clearing action of the strut is insured. This same increased tendency of the spring-strut to buckle further insures the separation of the parts of the fusible strut as soon as the solder is softened. It will be noted that the extended end of the spring-section $24^b$ is pronged, so as to embrace the engaged end of the strut-section 26, and thereby prevent the said parts from being accidentally separated by lateral movements.

It is very important to here note that the strut-sections 25 and 26 are soldered together at a point to one side of a line drawn between the notches $25^a$ and $26^c$ of the strut-sections 25 and 26, respectively, and it is of course obvious that the strain tending to buckle the said two strut-sections is applied directly between the said two points $25^a$ and $26^c$. Hence it is evident that when the solder is loosened the said two strut-sections will be instantly buckled. The engagement of the cam-lug $25^b$ with the cam-surface $26^b$ when the solder is melted further insures the lateral separation of the two strut-sections 25 and 26. This quick separation of the two strut-sections the instant the solder is loosened sufficiently to permit any movement whatever of the said strut-sections one upon the other is very important in a device of this character. In prior devices where this quick separation has not been insured it has frequently happened that the solder would be softened enough to permit a slight movement of the said strut-sections and then for one or the other of several reasons be again hardened, so as to connect the said strut-section.

As soon as the struts are thrown from their operative positions the spring 21 is released and with a powerful leverage action rocks the stopper 8 on the fulcrum-pin 20 and quickly forces the same laterally from operative position and opens up the orifice 2. It will thus be seen that the device above described is in all respects self-clearing in its action.

It is usual to provide in connection with an automatic sprinkler an annunciating-circuit, including a device located at a suitable point whereby a signal is given announcing that the particular sprinkler has been thrown into action. In Figs. 1 to 9, inclusive, I have illustrated a normally closed annunciator-circuit. In Fig. 8 the leads 19 are shown as connected in circuit with a battery $19^a$ and a magnet $19^b$, and the said magnet is arranged to operate a switch-lever $19^c$ of a normally broken bell-circuit $19^d$, which latter circuit includes a battery $19^e$, a contact-post $19^f$, and an electric bell $19^g$. The circuit between the contact-plugs 17 is closed by small wires 27 and a plug or metal rod 28, the latter of which is passed through a diametrical perforation or seat in the stopper 8. In its ends the plug 28 is slit as shown at 28ª, to receive the ends of the wires 27 and detachably hold the same when pressed thereupon. In virtue of this construction when the stopper 8 is thrown from its seat the plug or rod 28 will be detached from the circuit-wires 27, and the annunciator circuit will be thereby broken. Through ordinary or any suitable devices (not shown) the breaking of the annunciator-circuit is caused to actuate the distant annunciator.

In the construction illustrated in Figs. 10 and 11 the stopper 8 is similar to that illustrated in the other views, except that it is not provided with the projections 10 and 11 and is provided with seats or pockets 8ª for a purpose which will presently be noted. In this construction a normally open annunciator-circuit is employed and the circuit connections 27 are provided with yielding contact-pieces 29, which are normally concealed, one within each of the pockets 8ª of the stopper 8. With this construction when the stopper 8 is thrown from working position the stream of water passing from the orifice 2 will engage the contact-pieces 29 and close the annunciator-circuit.

In Fig. 12 I have illustrated a device whereby the water-supply orifice 2 may be closed whenever for any reason it is desired to temporarily or permanently close the said orifice so that it cannot be automatically opened. This device comprises a plug 30, having a conical lower end and a screw 31 working therein and provided with a knurled flange 32. The device is applied, as shown in said Fig. 12, with the recessed upper end of the screw 31 engaging the depending end of the screw 4. I propose to place these plugging devices at accessible points for use by firemen or others in closing water-supply orifices when desired after they have been opened by the heat or accident. It is frequently desirable to close these water-supply orifices when it is not desirable to shut off the supply of water through the main risers.

From what has already been stated it will be understood that the device above described is capable of considerable modification within the scope of my invention, as herein set forth and claimed.

What I claim, and desire to secure by Letters Patent of the United States, is as follows:

1. In an automatic sprinkler, the combination with a stopper normally closing the water-supply orifice, of a spring-strut normally holding said stopper in working position, and a fusible strut normally holding said spring-strut in working position, which two struts, when released are adapted to buckle with toggle actions, substantially as described.

2. In an automatic sprinkler, the combination with a stopper normally closing the water-delivery orifice, of a spring-strut yieldingly holding said stopper in position, said strut having a laterally-projecting finger or lug normally set under compression, and tending to buckle the toggle, by a strain which is additional to that produced by the endwise compression strain on said strut, and a fusible strut or element normally holding said spring-strut in position, substantially as described.

3. The combination with a sprinkler having a water-supply orifice, of a stopper normally closing said orifice, means involving a fusible element, for holding said stopper in working position, other means tending to unseat said valve, but normally restrained, and an electric circuit having one or more elements applied to said stopper, whereby the condition of the circuit is adapted to be changed when the said stopper is unseated, substantially as described.

4. The combination with a sprinkler-head having a water-delivery orifice, of a stopper normally closing said orifice, means involving a fusible element for normally holding said stopper in working position, and an electric circuit involving a metal plug seated in said stopper and detachably connected at its ends to the leads of said circuit, substantially as described.

5. The combination with a sprinkler-head having a water-delivery orifice, of a stopper normally closing said orifice, and means for normally holding said stopper in working position involving the spring-strut and the fusible strut, said spring-strut comprising the sections 23 and 24, the former having the lug 23ª and the latter having the shoulder 24ª and depending spring-arm 24ᵇ and said fusible strut involving the sections 25 and 26, the former having the cam-lug 25ᵇ and the latter having the cam-surface 26ᵇ, substantially as described.

6. The combination with the sprinkler-head having the water-delivery orifice, of a stopper normally closing said orifice and means for holding said stopper in working position involving the resistance-screw 4, the spring-strut reacting against said stopper and said resistance-screw, the split lug 6 supported from said sprinkler-head, the screw 7 working through said split lug and a fusible strut compressed between said screw 7 and said spring-strut and holding the latter in working position, substantially as described.

7. The combination with a sprinkler-head 1 having the orifice 2 and laterally-bowed yoke 3, of a lug projecting from the side of said yoke, a screw working through said lug, a stopper normally closing said orifice 2, and means for normally holding said stopper in working position involving a spring-strut, and a coöperating fusible strut, the latter of which is compressed between said spring-strut and said screw and stands to one side of a vertical line intersecting the said yoke 3, substantially as described.

8. The combination with the sprinkler-head having a water-delivery orifice, of a stopper normally closing said orifice, and means for holding said stopper in working position, involving a fusible strut made up of the channel-like section 26 and flat interposed section 25, said sections being soldered at $z$, the former having the cam-surfaces $26^b$ and the latter having the laterally-bent cam-lug $25^b$, substantially as described.

In testimony whereof I affix my signature in presence of two witnesses.

CHARLES B. GARRETT.

Witnesses:
ELIZABETH KELIHER,
F. D. MERCHANT.